United States Patent
Frank et al.

(10) Patent No.: US 6,215,869 B1
(45) Date of Patent: Apr. 10, 2001

(54) ARTICULATING TELEPHONE BASE

(75) Inventors: Chris Frank, Oakland; John Smith, San Francisco, both of CA (US)

(73) Assignees: Sony Corporation, Tokyo (JP); Sony Corporation America, Parkridge, NJ (US)

( * ) Notice: Subject to any disclaimer, the term of this patent is extended or adjusted under 35 U.S.C. 154(b) by 0 days.

(21) Appl. No.: 09/193,275

(22) Filed: Nov. 17, 1998

(51) Int. Cl.$^7$ .................................................. H04M 1/00
(52) U.S. Cl. ................................................................. 379/428
(58) Field of Search ...................................... 379/446, 447, 379/455, 454, 428

(56) References Cited

U.S. PATENT DOCUMENTS 5,040,712 * 8/1991 Pesonen et al. ...................... 379/455
5,222,132 * 6/1993 Rioux, Jr. .............................. 379/454
5,974,332 * 10/1999 Chung .................................... 379/455

* cited by examiner

*Primary Examiner*—Jack Chiang
(74) *Attorney, Agent, or Firm*—Jay H. Maioli

(57) ABSTRACT

A telephone including a telephone base having a bottom convex surface and including a first pair of guide rails, in which the bottom convex surface has a number of recesses; and a telephone base support having a second pair of guide rails and adapted to slidably support the telephone base by cooperation between the first and second pairs of guide rails. The telephone base support includes an elastic member for successively engaging the plurality of recesses one by one, so that the telephone base slides on the telephone base support in discrete steps when the user articulates the telephone base.

9 Claims, 4 Drawing Sheets

ARTICULATING TELEPHONE BASE

BACKGROUND OF THE INVENTION

The present invention relates to the field of telephones. More particularly, the present invention relates to telephones having articulating bases for adjusting the position of the telephone.

Articulating features have been incorporated into current telephones such as the telephone having a slidable speaker unit disclosed in U.S. Pat. No. 5,461,672 to Enokido et al.

Currently, with telephones and liquid-crystal-displays (LCDs) in wide use, both technologies have been integrated to offer consumers telephones with LCD displays. The LCD displays are used to display caller ID, telephone directories, answering machine information, operating instructions, etc.

Because LCDs have a limited optimal viewing angle, however, conventional LCD displays on telephones are often difficult to see without the user having to move to a better viewing position. This problem is aggravated by the multiple locations where the telephones can be placed, on top of a desk or wall mounted, for example.

OBJECTS AND SUMMARY OF THE INVENTION

The present invention is intended to overcome the above problems and consists of a telephone base that can be articulated on a telephone base support, thereby giving the user the flexibility to adjust the position of the telephone to improve the visibility of the display.

Accordingly, it is an object of the present invention to provide an articulated telephone structure that will give the user the flexibility to adjust the position of the telephone.

In accordance with one aspect of the present invention, the telephone includes a telephone base having a telephone function and including a first pair of guide rails, a bottom convex surface having a plurality of recesses, and a telephone base support having a second pair of guide rails and adapted to slidably support the telephone base by a cooperation between the first and second pairs of guide rails, wherein the telephone base support includes an elastic member for engaging the plurality of recesses so that the telephone base slides on the telephone base support in discrete steps when a user manipulates the telephone base.

In accordance with another aspect of the present invention, the telephone includes a telephone base having a telephone function and including a first pair of curved guide rails and a side surface having an elastic member, and a telephone base support having a second pair of guide rails formed on corresponding side surfaces thereof and adapted to slidably support the telephone base by cooperation between the first and second pairs of guide rails, wherein one of the side surfaces of the telephone base support includes a plurality of recesses for engaging the elastic member so that the telephone base slides on the telephone base support in discrete steps when a user articulates the telephone base.

These and other objects, advantages, and features of the present invention will become apparent to those skilled in the art upon consideration of the following description of the present invention.

DETAILED DESCRIPTION OF THE INVENTION

Figure 1:
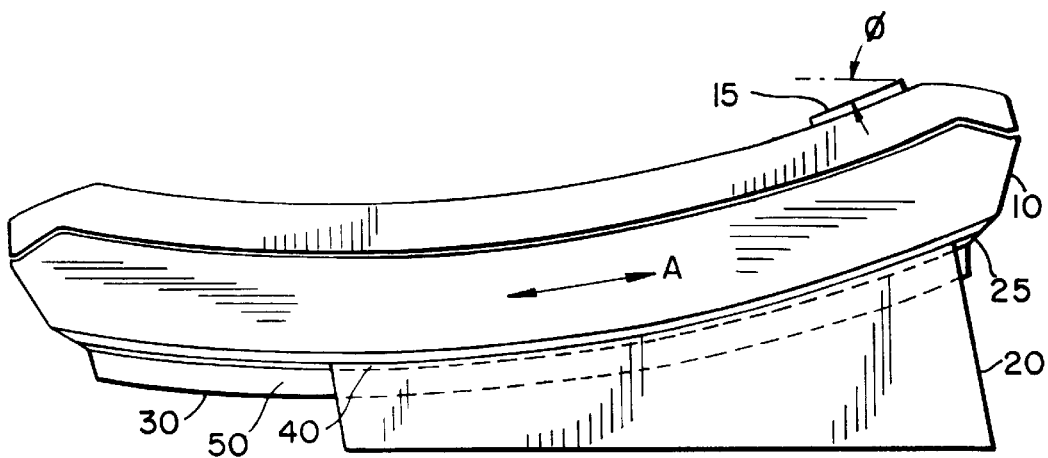
FIG. 1 is a side view of the telephone with an articulating base in a first position according to an embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Figure 2:
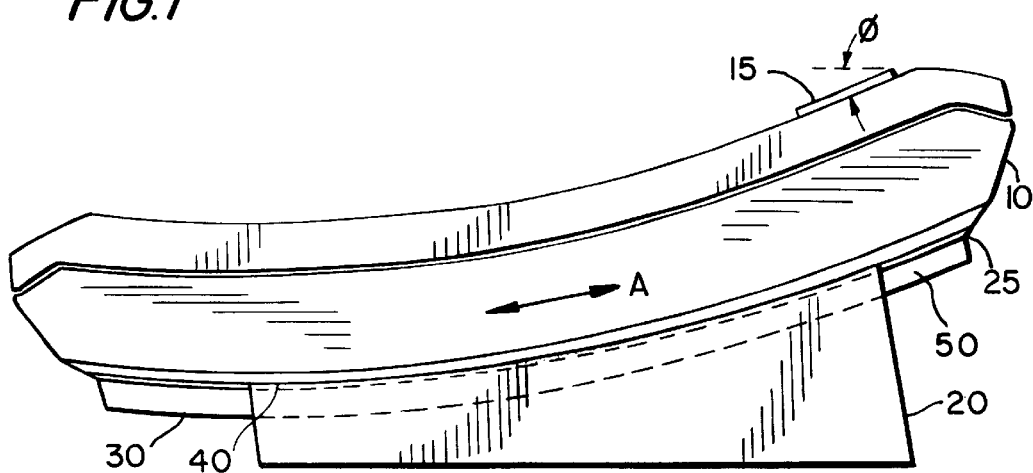
FIG. 2 is a side view of the telephone with an articulating base in a second position according to the embodiment of the present invention.
Figure 3:
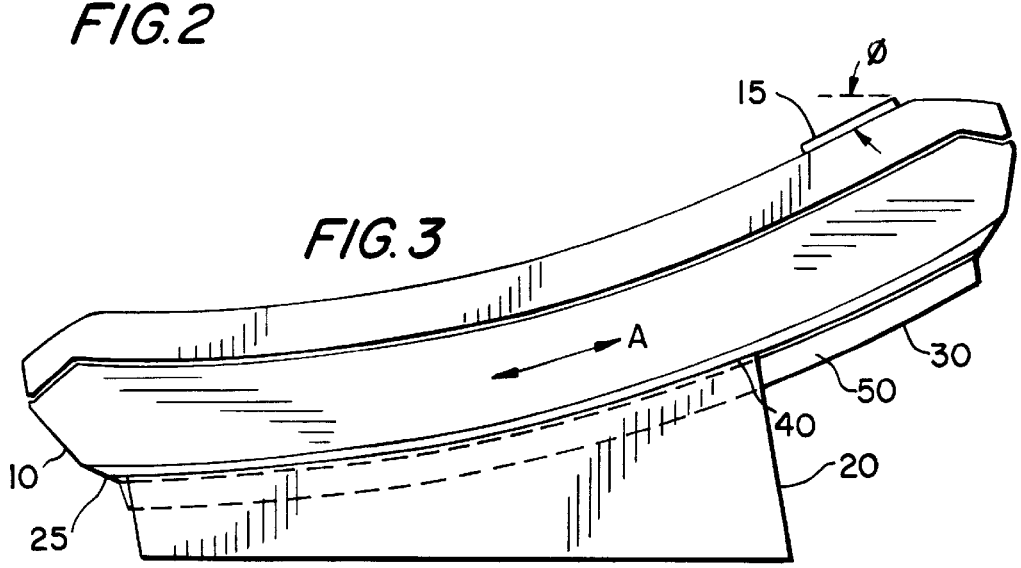
FIG. 3 is a side view of the telephone with an articulating base in a third position according to the embodiment of the present invention.

Turning now to FIGS. 1–3, the articulating telephone base feature according to an embodiment of the present invention will be described. A telephone base 10 having a telephone function and including an LCD display 15 is adapted to slide on a telephone base support 20 along a path shown by the arrow A. As illustrated in FIGS. 1–3, the angular position Ø of the LCD display 15 changes depending on the position of the telephone base 10 with respect to the telephone base support 20. This change in angular position Ø allows the user to place the LCD display at an optimal viewing angle independently from where the telephone base 10 is placed. It will be appreciated that as the base 10 moves from left to right in FIGS. 1–3 relative to the support 20, the angle Ø increases. In addition, by providing a longer support 20 or changing the respective angle of curvature of the base 10 and support 20 a greater angular change than shown in FIGS. 1–3 can be obtained.

Figure 4:
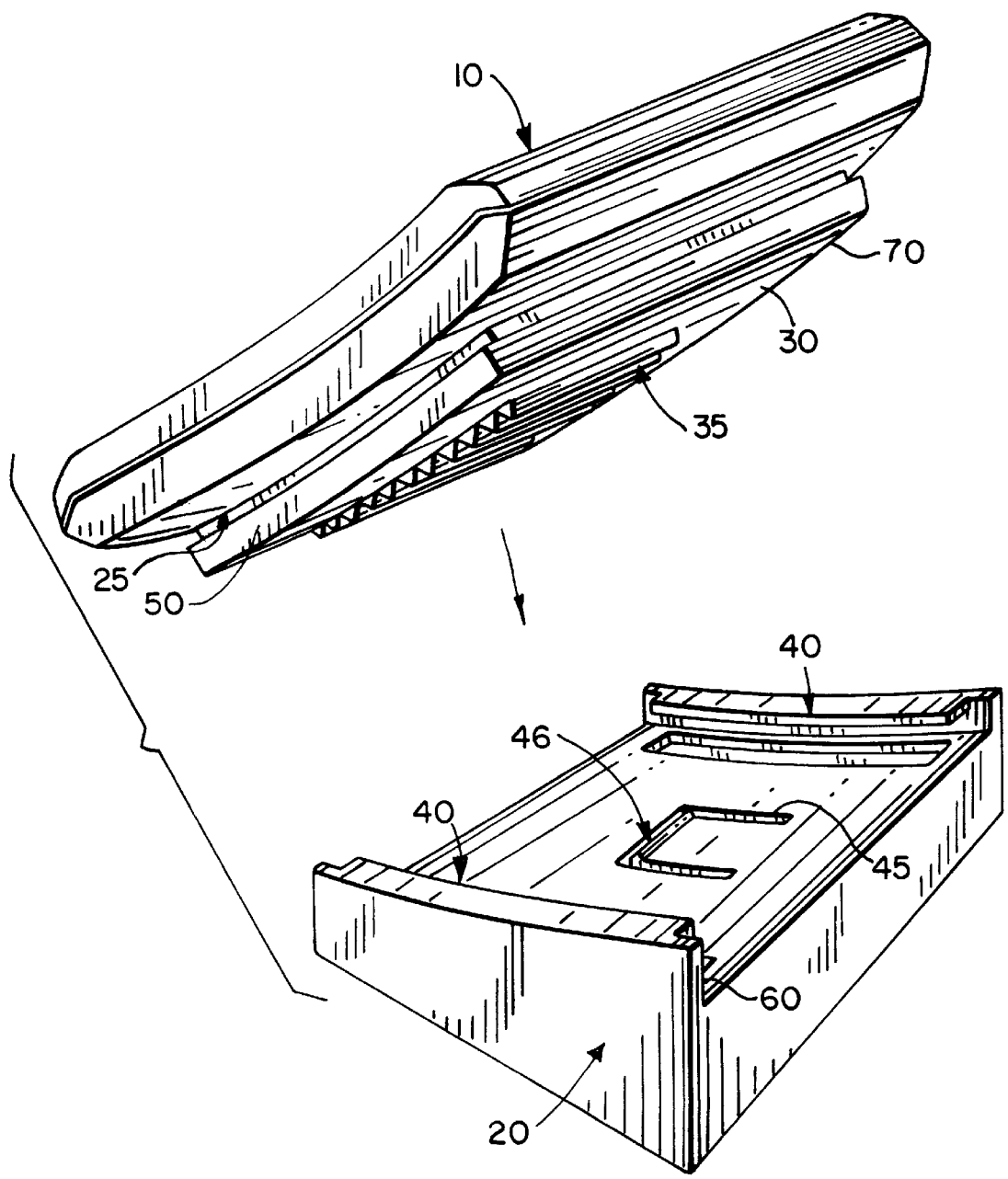
FIG. 4 is an exploded view of the telephone with an articulating base showing an operating mechanism according to a first embodiment of the present invention.

Turning now to FIG. 4, a detailed structure of the articulating telephone base according to an embodiment of the present invention will be described. The telephone base 10 includes a first pair of guide rails 25 and a bottom convex surface 30. The bottom convex surface 30 includes a plurality of sawtooth elements forming detents or recesses 35. The telephone base support 20 includes a second pair of guide rails 40 which fit on the first pair of guide rails 25, thereby slidably supporting the telephone base 10 as shown in FIGS. 1–3.

Further, as seen in FIG. 4, the telephone base support 20 includes a U-shaped elastic member 45 unitarily formed with the telephone base support 20. The elastic member 45 has a sawtooth element 46 for engagement with one of the recesses 35. The elastic member 45 by reason of being formed of the same plastic as the support 20 and having the shown U-shape will tend to be biased upwardly. Alternatively, the elastic member could be spring biased so that the tooth element 46 engages the plurality of recesses 35. In this way the telephone base 10 slides on the telephone base support 20 in discrete steps when the user articulates the telephone base 10 to obtain an optimum viewing angle for the LCD display 15, shown in FIGS. 1–3.

Figure 5:
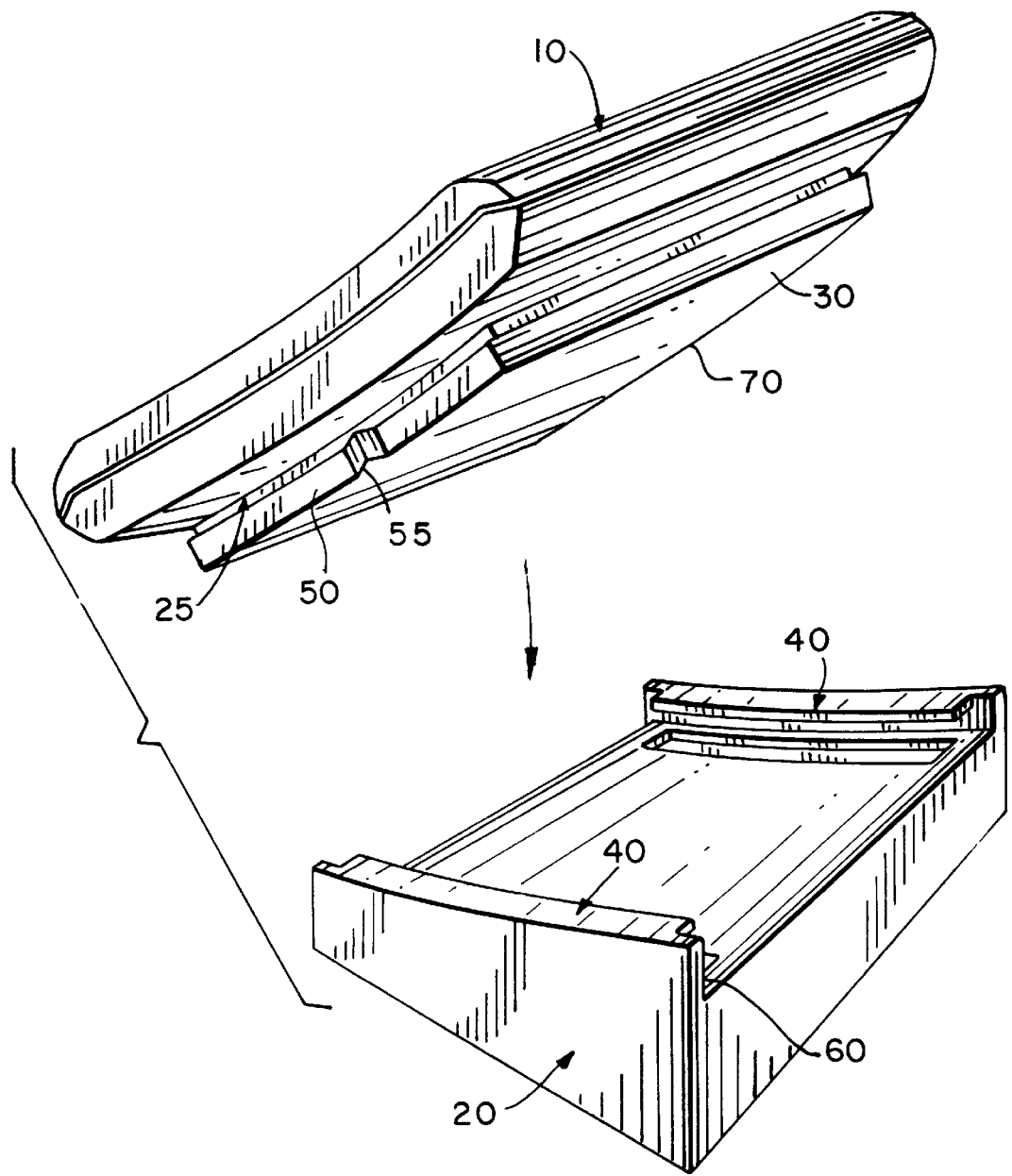
FIG. 5 is an exploded view of the telephone with an articulating base showing an operating mechanism according to another embodiment of the present invention.
Figure 6:
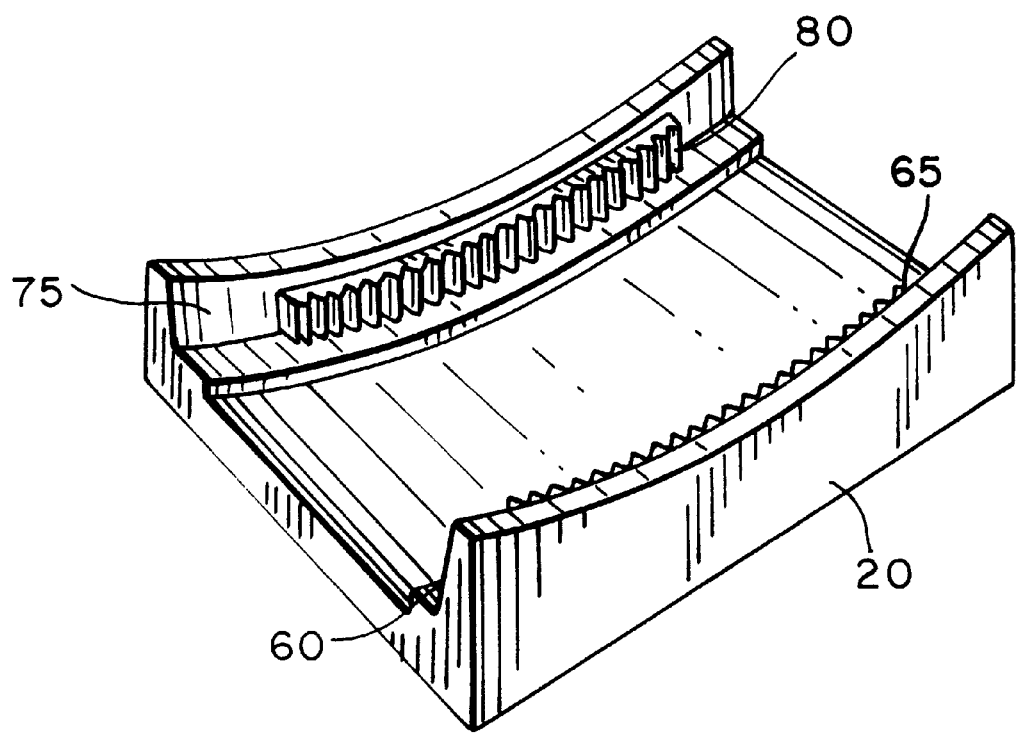
FIG. 6 shows a detail of a plurality of recesses formed in the telephone base support, with the guide rails removed for clarity, according to yet another embodiment of the present invention.

Turning now to FIGS. 5 and 6, the articulating telephone base feature according to another embodiment of the present invention will be described. The description of features common with the embodiment shown in FIG. 4 described above will not be repeated.

The telephone base 10 includes on a side surface 50 an elastic member 55, and a corresponding side surface 60 on the telephone base support 20 includes a plurality of detents or recesses 65. The elastic member 55 can be formed of a soft, deformable plastic material, or it can be formed as a spring biased arm, similar to element 45 in FIG. 4. The cooperation between the elastic member 55 and the plurality of recesses 65 on their respective side surfaces prevents the telephone base 10 from sliding too easily and permits the telephone base 10 to move in discrete steps relative to the support 20.

A variation of the embodiment shown in FIGS. 5 and 6 is to duplicate the cooperating structure formed by the elastic member 55 and the plurality of recesses 65 on the opposite side of the telephone on side surfaces 70 and 75, respectively. The resulting variation would result in another plurality of recesses 80 formed on the side surface 75 and another elastic member (not shown) on the side surface 70.

Another variation of the cooperating first and second guide rails 25 and 40 is to reverse their structure from 25 being a groove and 40 being the mating structure to 40 being the groove and 25 being the mating structure.

A further variation is to reverse the positions of the plurality of recesses 35 and the elastic member 45 in the embodiment shown in FIG. 4, or reverse the positions of the plurality of recesses 65 and the elastic member 55 in the other embodiment shown in FIGS. 5 and 6.

This invention has been illustrated using a telephone as an example but it would be equally useful in any electronic device having an LCD display.

Thus, it is apparent that in accordance with the present invention an apparatus that fully satisfies the objectives, aims, and advantages is set forth above. While the invention has been described in conjunction with specific embodiments, it is evident that many alternatives, modifications, permutations, and variations will become apparent to those skilled in the art in the light of the foregoing description. Accordingly, it is intended that the present invention embrace all such alternatives, modifications and variations as fall within the scope of the appended claims.

What is claimed is:

1. A telephone, comprising:
   a telephone base having a telephone function and including a rigidly mounted liquid-crystal-display on a top surface thereof, a first pair of guide rails and a bottom convex surface having a plurality of recesses; and
   a telephone base support having a second pair of guide rails and adapted to slidably support said telephone base by cooperation between said first and second pairs of guide rails, wherein said telephone base support includes an elastic member for successively engaging said plurality of recesses one by one as said telephone base slides on said telephone base support, thereby positioning said telephone base in discrete steps relative to said telephone base support to provide a user with an adjustable viewing angle for more easily viewing said liquid-crystal-display.

2. The telephone according to claim 1, wherein said elastic member is U-shaped.

3. The telephone according to claim 2, wherein said elastic member is unitarily formed with a surface of said telephone base.

4. The telephone according to claim 3, wherein said elastic member is biased in a direction toward said telephone base.

5. The telephone according to claim 1, wherein said plurality of recesses are formed on a center portion of said bottom convex surface.

6. A telephone, comprising:
   a telephone base having a telephone function and including a rigidly mounted liquid-crystal-display on a top surface thereof, a first pair of convex guide rails and an elastic member formed on a side surface of said base; and
   a telephone base support having a second pair of guide rails formed on respective side surfaces thereof and adapted to slidably support said telephone base by cooperation between said first and second pairs of guide rails, wherein one of said side surfaces of said telephone base support includes a plurality of recesses, whereby said elastic member successively engages said plurality of recesses one by one, so that said telephone base slides on said telephone base support in discrete steps relative to said telephone base support to provide a user with an adjustable viewing angle for more easily viewing said liquid-crystal-display.

7. The telephone according to claim 6, wherein said elastic member is unitarily formed with said side surface of said telephone base.

8. The telephone according to claim 7, wherein said plurality of recesses are elastic.

9. The telephone according to claim 7, further comprising another elastic member formed on another side surface of said telephone base, and another one of said side surfaces of said telephone base support having another plurality of recesses for engaging said other elastic member.

* * * * *